(12) United States Patent
Het Hooft et al.

(10) Patent No.: US 8,655,184 B2
(45) Date of Patent: Feb. 18, 2014

(54) HIGHER ORDER DISPERSION COMPENSATION DEVICE

(75) Inventors: Gert Het Hooft, Eindhoven (NL); Bernardus Hendrikus Wilhelmus Hendriks, Eindhoven (NL); Mischa Megens, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 331 days.

(21) Appl. No.: 12/993,264

(22) PCT Filed: May 20, 2009

(86) PCT No.: PCT/IB2009/052114
§ 371 (c)(1),
(2), (4) Date: Nov. 18, 2010

(87) PCT Pub. No.: WO2009/144635
PCT Pub. Date: Dec. 3, 2009

(65) Prior Publication Data
US 2011/0069388 A1    Mar. 24, 2011

(30) Foreign Application Priority Data

May 30, 2008   (EP) .................................... 08157326

(51) Int. Cl.
*H04B 10/12*   (2011.01)
(52) U.S. Cl.
USPC ............. 398/147; 398/81; 398/158; 398/159; 398/161; 385/24; 385/37; 385/27; 385/11; 372/25; 372/26; 372/9; 359/333; 359/489.02; 359/341.1
(58) Field of Classification Search
USPC ............. 398/149, 81, 158, 159, 160, 33, 148, 398/161, 84, 86, 87, 147, 79; 385/24.37, 385/27, 16, 17, 18, 11, 31; 372/25, 9, 26; 359/237, 238, 489, 489.02, 333, 341.1
See application file for complete search history.

(56) References Cited

U.S. PATENT DOCUMENTS 3,873,825 A    3/1975  Jones et al.
4,655,547 A *  4/1987  Heritage et al. .............. 359/563
(Continued)

FOREIGN PATENT DOCUMENTS

CN    1887220 A    1/2007
JP    1989233416 A    9/1989
(Continued)

OTHER PUBLICATIONS

Schodel, R.: "Compensation of Wavelength Dependent Image Shifts in Imaging Optical Interferometry"; Applied Optics, Oct. 2007, vol. 46, No. 30, pp. 7464-7468.

(Continued)

*Primary Examiner* — Hanh Phan

(57) ABSTRACT

The present invention relates to a higher-order dispersion compensation device (210), the device being adapted to cooperate with a pair of optical components (P1, P2), e.g. a pair of prisms, being arranged to compensate first-order dispersion by separating different wavelengths spatially. The compensation device (210) has the form of a phase plate, wherein the phase change for each wavelength is adjusted by designing the height (h) at the corresponding position (x) of the plate so as to substantially compensate for higher-order dispersion. The invention is advantageous for obtaining a higher-order dispersion compensation device which is relatively simple to construct and use making it a quite cost-effective device. The invention also relates to a corresponding optical system and method for compensating dispersion where this is important, e.g. in a multiple-photon imaging system.

20 Claims, 6 Drawing Sheets

(56) References Cited

U.S. PATENT DOCUMENTS

| | | | |
|---|---|---|---|
| 5,132,824 A | 7/1992 | Patel et al. | |
| 7,903,326 B2 * | 3/2011 | Gaudiosi et al. | 359/333 |
| 2003/0053737 A1 | 3/2003 | Izumi | |
| 2005/0169578 A1 | 8/2005 | Choi et al. | |
| 2007/0014317 A1 | 1/2007 | Liu | |

FOREIGN PATENT DOCUMENTS

| | | |
|---|---|---|
| JP | 1999133262 A | 5/1999 |
| JP | 2007156083 | 6/2006 |
| WO | 9215903 A1 | 9/1992 |
| WO | 9830931 A1 | 7/1998 |
| WO | 2006106523 A1 | 10/2006 |

OTHER PUBLICATIONS

Weiner. A.: "Femtosecond Pulse Shaping Using Spatial Light Modulators", Review of Scientific Instruments, May 2000, vol. 71, No. 5, pp. 1929-1960.

Muller et al: "Dispersion Pre-Compensation of 15 Femtosecond Optical Pulses for High-Numerical-Aperture Objectives"; Journal of Microscopy, Aug. 1998, vol. 191; Part 2, pp. 141-150.

Wolleschensky et al: "Characterization and Optimization of a Laser-Scanning Microsope in the Femtosecond Regime"; Applied Phsyics B, Lasers and Optics, 1998, vol. 67, pp. 87-94.

Fork et al: "Compression of Optical Pulses to Six Femtoseconds by Using Cubic Phase Compensation"; Optics Letters, Jul. 1987, vol. 12, No. 7, pp. 483-485.

* cited by examiner

HIGHER ORDER DISPERSION COMPENSATION DEVICE

FIELD OF THE INVENTION

The present invention relates to a higher-order dispersion compensation device in for example multi-photon imaging system wherein low dispersion is important. The invention also relates to an optical system with a higher-order dispersion compensation device, and a method for compensating higher-order dispersion in an optical system.

BACKGROUND OF THE INVENTION

Multi-photon microscopy like imaging based on two-photon absorption or second harmonic generation (SHG) are becoming increasingly used in medical imaging and other kind of imaging. In multi-photon microscopy, the signal is inversely proportional to the temporal width of the optical pulse at the location of the focus. It is therefore of paramount importance to minimize the pulse width as much as possible. Most optical elements in a scanning multi-photon microscope, such as objective lenses or scanning head etc, will give rise to material dispersion, i.e. the wavelength dependence of the refractive index. The shorter the optical pulse the larger the spectral bandwidth, and thus the larger the effect of dispersion. The variation in transit time as a function of wavelength is described by a material dispersion quantity M which relates to the second order derivative of the refractive index to wavelength:

$$M = \frac{\lambda^3 l}{2\pi c^2} \frac{\partial^2 n}{\partial \lambda^2}$$

c is the velocity of light in air, is the wavelength, l is the thickness of the optical material and n the refractive index. In the normal dispersion regime, the second derivative is positive, meaning that for shorter wavelengths it takes longer to travel through a piece of glass than for longer wavelengths. For standard glass like BK7, M/l is approximately 45 fs$^2$/mm, meaning that for a pulse with a bandwidth of say 0.1 PHz (=0.1 fs$^{-1}$) travelling through 10 mm of glass the increase in pulse width will be in the order of 45 fs. This pulse broadening effect is more accurately described by:

$$\Delta t = \tau_{FL} \sqrt{1 + \left(\frac{M}{\tau_{FL}^2} 4 \ln 2\right)^2}$$

where $\tau_{FL}$ is the Fourier limited pulse width, i.e. the shortest possible given the spectral content of the optical source. Here it is assumed that the spectrum has a Gaussian shape, which gives rise to a Gaussian temporal distribution. To give an example: at a central wavelength of 800 nm and a bandwidth of 40 nm the optical pulse can be as short as 23.6 fs in its Fourier limit. The relation between spectral bandwidth, $\Delta\lambda$, (FWHM of the intensity) and Fourier limited pulse width for Gaussian distributions is given by:

$$\tau_{FL} = \frac{\lambda^2}{c} \frac{2 \ln 2}{\pi} \Delta\lambda^{-1}$$

Thus, it is apparent from the above that the dispersion is all the more important for larger band widths.

For most microscope systems, the total dispersion of all the optical elements amounts to a value between 5000 and 7000 fs$^2$. It can be calculated what the spectral bandwidth of the source should be from the above equations. For small band widths, the dispersion effect is small but the pulse width will be large anyway. For a very large bandwidth the pulse width without dispersion is small, but the dispersion effects are so overwhelming that the end result may be even worse than the first case. The best source to be used is the one that has a spectral band width such that the pulse broadens by √2 given the material dispersion. For most microscopes this means that the optimum optical laser source to be used has a pulse width around 100-200 fs. Most commercial ultra-fast lasers are now in this range. In order to improve on the above described situation, one needs to have a laser source with shorter pulses and thus larger band width, and furthermore one needs to compensate the dispersion effect as much as possible. To a large extent this can be accomplished with a pair of prisms and/or grating pairs, cf. R. L. Fork, C. H. Brito Cruz, P. C. Becker and C. V. Shank, "Compression of optical pulses to six femtoseconds using cubic phase compensation", Optics Letters 12(7) (1987) pp 483-485.

In the above only linear dispersion effects have been described. This means that during the optical pulse the mean frequency increases or decreases linearly in time. (For a Fourier limited pulse the mean frequency is constant). In principle higher order than linear can occur. This is indeed the case for a prism pair where quadratic chirp effects limit the dispersion compensation. The instantaneous frequency equals the first derivative of the optical phase with respect to time, the linear chirp corresponds to the second derivative of the optical phase with respect to time, and the quadratic chirp is the same as a cubic term in the phase. For a prism pair this amounts to:

$$\frac{\partial^3 \phi}{\partial \omega^3} = \left(\frac{\lambda}{2\pi c}\right)^2 \frac{12 l \lambda^2}{c} \left[\left(\frac{\partial n}{\partial \lambda}\right)^2 + \lambda \frac{\partial n}{\partial \lambda} \frac{\partial^2 n}{\partial \lambda^2}\right]$$

Fork et. al. also demonstrate higher order dispersion compensation by using a combination of prisms and/or gratings but this is a rather voluminous solution. Furthermore, the additional optical components give rise to optical loss and only cubic terms can be compensated.

Recently, pulse shapers with spatial light modulators (SLM) have appeared, c.f. A. M. Weiner, "*Femtosecond pulse shaping using spatial light modulators*" Rev. Sci. Instr. 71 (2000) 1929 for a review. In a pulse shaper, the various spectral components are spread out in angle and with a Fourier lens or mirror spread out in position. The beam is then sent through a spatial light modulator (SLM). This latter device is a linear array of liquid crystal pixels i.e. a liquid crystal device. At each pixel the refractive index can be adjusted by applying the appropriate voltage. Since each pixel corresponds to a small wavelength range, the phase can in principle be set over the total band width in any functional form and instantaneously optimized. The disadvantages of the SLM are mainly that the phase swing at each pixel is usually not larger than 2 and the pixels have all the same size. To set the phase of each pixel, complicated driver electronics is required, making the device expensive. Furthermore, because a part of the pixel area is used for driving circuits, a SLM and gratings cause light losses, reducing the available laser power.

Hence, an improved higher-order dispersion compensation device would be advantageous, and in particular a more efficient and/or reliable device would be advantageous.

SUMMARY OF THE INVENTION

Accordingly, the invention preferably seeks to mitigate, alleviate or eliminate one or more of the above mentioned disadvantages singly or in any combination. In particular, it may be seen as an object of the present invention to provide a high-order dispersion compensation device that solves the above mentioned problems of the prior art with for instance too voluminous or rather complicated solutions.

This object and several other objects are obtained in a first aspect of the invention by providing a higher-order dispersion compensation device, the device being adapted to cooperate with a pair of optical components arranged to compensate first-order dispersion by separating different wavelengths spatially, the compensation device having the form of a phase plate, wherein the phase change for each wavelength is adjusted by designing the height at the corresponding position of the plate so as to substantially compensate for higher-order dispersion.

The invention is particularly, but not exclusively, advantageous for obtaining a higher-order dispersion compensation device which is relatively simple to construct and use making it a quite cost-effective device. It should also be noted that the induced phase change for each wavelength can be set to values larger than 2 which is normally not possible for a pulse shaper with a liquid crystal device for phase compensation. The present invention has the additional advantage over a pulse shaper with a liquid crystal device, that the width of a step in the height distribution on the plate (corresponding to a pixel in the liquid crystal device) need not be the same over the whole wavelength range i.e. the width or extension of the various heights can be different across the phase plate according to the present invention.

Typically, the height distribution is change in only one dimension across the phase plate, but it is contemplated that for some optical applications it may be advantageous to allow the height distribution to depend on a second dimension of the phase plate i.e. the depth of the phase plate as seen in a cross-sectional side view, cf. FIG. 4 below.

The present invention may be beneficially applied in connection with a first order dispersion set-up, e.g. in a double prism compensator or a set-up where a combination of grating and a lens is used twice. Alternatively, the invention may be applied in connection with a first order dispersion set-up where a combination of grating and a curved mirror is used twice.

In the context of the present invention, the term "higher-order" dispersion may be defined when considering a familiar Taylor expansion around a fixed circular frequency, $\omega_0$, of the phase;

$$\phi = \phi(\omega_0) + \frac{d\phi}{d\omega}\bigg|_{\omega_0}(\omega - \omega_0) + \frac{1}{2}\frac{d^2\phi}{d\omega^2}\bigg|_{\omega_0}(\omega - \omega_0)^2 + \frac{1}{6}\frac{d^3\phi}{d\omega^3}\bigg|_{\omega_0}(\omega - \omega_0)^3 + \dots$$

The first derivative of the phase corresponds to a time delay through e.g. a prism, whereas the second derivate of the phase with respect to the frequency represents the linear dispersion. The first order dispersion can be quantified, at given wavelength and distance through a material, by the material dispersion quantity, M, being dependent on the square of the first-order derivate of the refractive index with respective to wavelength as explained in the introduction. This first-order dispersion can be compensated with a conventional pair of prisms suitably arranged for that purpose. Higher order dispersion in the context of the present invention is accordingly the terms in the above Taylor expansion originating from the third-order derivate, and higher order derivatives, of the phase, $\phi$, with respect to the frequency, $\omega$, or equivalent differential expressions.

Beneficially, the height as a function of position (h(x)) may be a substantially continuous function, at least on some parts of the plate. Alternatively, the device may have a substantially plane rear surface, and a front surface with stepped heights, at least on some parts of the plate.

Typically, the height as a function of position (h(x)) may be a monotonically increasing function, at least on some parts of the plate, by other options may also be applied depending on the optical set-up. Beneficially, the height as a function of position (h(x)) may be approximately a third-order polynomial, or higher, at least on some parts of the plate.

In one embodiment, the device may be adapted to cooperate with a pair of substantially identical components. Generally, the relation between the phase change, $\Delta\phi$, as a function of position, x, across the device and the height as a function of position across the device, h(x), may then be given in the form of $$\Delta\phi(x) = h(x)F(\lambda, O\_Pa, RP, O\_Prop),$$

where the function F is dependent on:
$\lambda$: the wavelength
O_Pa: the optical path
RP: the relative positions of the plate and pair of optical components, and
O_Prop: the optical properties of the pair of optical components.

For a pair of prisms, the optical properties of the pair of optical components, O_Prop, may then comprise the refractive index, n, of the prisms, and the top angle of the prisms to obtain a device for compensating higher-order dispersion efficiently.

For a pair of gratings, and the optical properties of the pair of optical components, O_Prop, may then comprise the grating constant, k, of the gratings to obtain a device for compensating higher-order dispersion efficiently.

The device may be manufactured substantially in a polymer, preferably PMMA, PC, COC or in a type of glass. Alternatively, the device may be manufactured with UV-curable resin on a transparent substrate.

In a second aspect, the invention relates to an optical system for compensating dispersion; the system comprising:
a pair of optical components arranged to compensate first-order dispersion by separating different wavelengths spatially, and
a higher-order dispersion compensation device, the compensation device having the form of a phase plate, wherein the phase change for each wavelength is adjusted by designing the height at the corresponding position of the plate so as to substantially compensate for higher-order dispersion,
wherein the higher-order dispersion compensation device is adapted to cooperate with the pair of optical components by taking into account, at least;
the optical properties of the pair of optical components, and
the relative positions between the higher-order dispersion compensation device and the pair of optical components.

Beneficially, the height distribution may depend on the relative positions between the higher-order dispersion compensation device and the pair of optical components comprises the distance (l) and angle of incidence (θ) to each optical component.

In one embodiment, the pair of optical components may be a substantially identical pair of prisms, and the optical properties of the pair of prisms comprise the refractive index, n, and the wavelength dependent part of the refractive index in the prisms. In other embodiments, grating may be applied.

The system may be applied in optical imaging system utilizing non-linear optical phenomena for instance in a multi-photon imaging system or a second harmonic generation (SHG) imaging system, where higher-order dispersion is relevant.

In a third aspect, the invention relates to a method for compensating dispersion, the method comprising:

providing a pair of optical components arranged to compensate first-order dispersion by separating different wavelengths spatially, and providing a higher-order dispersion compensation device, the compensation device having the form of a phase plate, wherein the phase change for each wavelength is adjusted by designing the height at the corresponding position of the plate so as to substantially compensate for higher-order dispersion, the method further comprising adapting the higher-order dispersion compensation device to cooperate with the pair of optical components by taking into account, at least;

the optical properties of the pair of optical components, and the relative positions between the higher-order dispersion compensation device and the pair of optical components.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The present invention will now be explained, by way of example only, with reference to the accompanying Figures, where.

DETAILED DESCRIPTION OF AN EMBODIMENT

Figure 1:
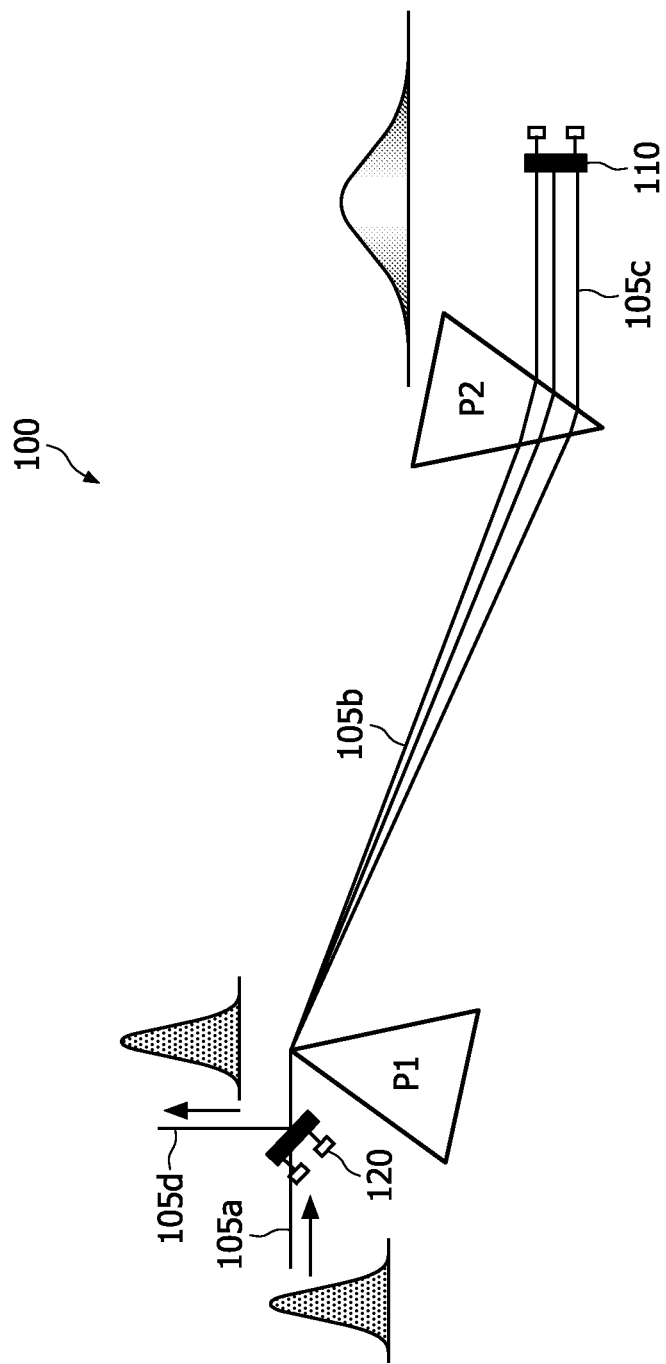
FIG. 1 is a schematic drawing of a first-order dispersion compensation system with a pair of prisms.

FIG. 1 is a schematic drawing of a first-order dispersion compensation system 100 with a pair of prisms P1 and P2 with the optical path of the radiation 105 indicated. The system is arranged in a double-pass set-up where in radiation 105a passes over mirror 120. The first prism P1 spreads out the various wavelengths in angle, such that the longer the wavelength the more it travels through glass of the second prism P2. This has the opposite effect than material dispersion. The linear dispersion of the prism pair P1 and P2 can be calculated as:

$$M = -\frac{2\lambda^3 l}{\pi c^2}\left(\frac{\partial n}{\partial \lambda}\right)^2,$$

here l is the distance between the two apex of the prisms P1 and P2. Note the minus sign and the fact that the first derivative of the refractive index of the prism to wavelength is appearing, making the effect substantially large for reasonable distances of the prisms. After travelling through the prism pair P1 and P2, the various spectral components are spread out in space over the beam diameter. This is not desirable; therefore, one may use either a second pair (not shown in FIG. 1) in mirror position to the first pair of prisms, P1 and P2, or better with a mirror 110, shown in FIG. 1, the beam 105 is sent back through the same prisms P1 and P2 i.e. in a double pass. Both arrangements make the negative dispersion twice as large. Usually, one makes the distance between the prisms too large, so that the dispersion of the rest of the system is overcompensated. One can tune to almost zero dispersion by shifting one or both prisms, P1 and/or P2, in a direction perpendicular to the base of the prisms. The amount of glass is then increased or decreased depending on the direction, without changing the beam paths. In this way, the prism compensator is flexible and applicable to more situations.

Figure 2:
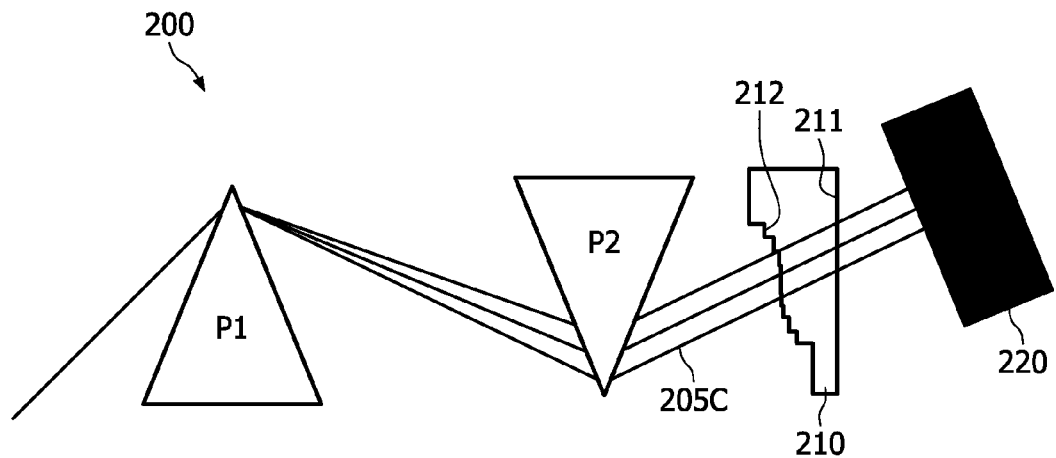
FIG. 2 is a schematic drawing of dispersion compensation system with a phase plate according to the present invention.

FIG. 2 is a schematic drawing of a dispersion compensation system 200 with a phase plate according to the present invention. The optical system 200 for compensating dispersion comprises a pair of optical components P1 and P2 arranged to compensate first-order dispersion by separating different wavelengths spatially similar to FIG. 1. However, the first-order compensation can alternatively be accomplished by other optically equivalent elements i.e. a pair of gratings, each grating having a lens or curved mirror as it is well-known to a person skilled in optics, see e.g. R. L. Fork, C. H. Brito Cruz, P. C. Becker and C. V. Shank, "Compression of optical pulses to six femtoseconds using cubic phase compensation", Optics Letters 12(7) (1987) pp 483-485, which is hereby incorporated by reference in its entirety.

A higher-order dispersion compensation device 210 is introduced into the optical path, the compensation device having the form of a phase plate, wherein the phase change Δφ for each wavelength λ is adjusted by designing the height at the corresponding position of the plate 210 so as to substantially compensate for higher-order dispersion i.e. the terms $$\frac{1}{6}\frac{d^3\phi}{d\omega^3}\bigg|_{\omega_0}(\omega-\omega_0)^3 + \frac{1}{24}\frac{d^4\phi}{d\omega^4}\bigg|_{\omega_0}(\omega-\omega_0)^4$$

and further higher-order terms in the Taylor expansion of the phase φ.

The higher-order dispersion compensation device 210 is adapted to cooperate with the pair of optical components i.e. the prisms P1 and P2 by taking into account the optical properties O_Prop of the pair of optical components, i.e. the refractive index n of the prisms. Typically the two optical components are identical, or substantially identical, but this need not be the case always. The relative positions RP between the higher-order dispersion compensation device 210 and the pair of optical components P1 and P2 are also taken into account, though linear displacement of the device 210 along the optical path normally does not change the cooperation between the device 210 and the prisms. Needless to say, the actual wavelength of the incoming radiation 105 should also to be taking into account. The device, in this cross-sectional view, has a substantially plane rear surface 211, and a front surface 212 with stepped heights.

The higher-order dispersion compensation device 210 is beneficially positioned substantially at Brewster angle relative to beam 205. The prisms P1 and P2 can also be Brewster prisms to minimize losses. The device 210 can also be attached or positioned substantially adjacent either the mirror 220 or on the prism P2 if the device 210 is designed for that purpose.

Figure 3:
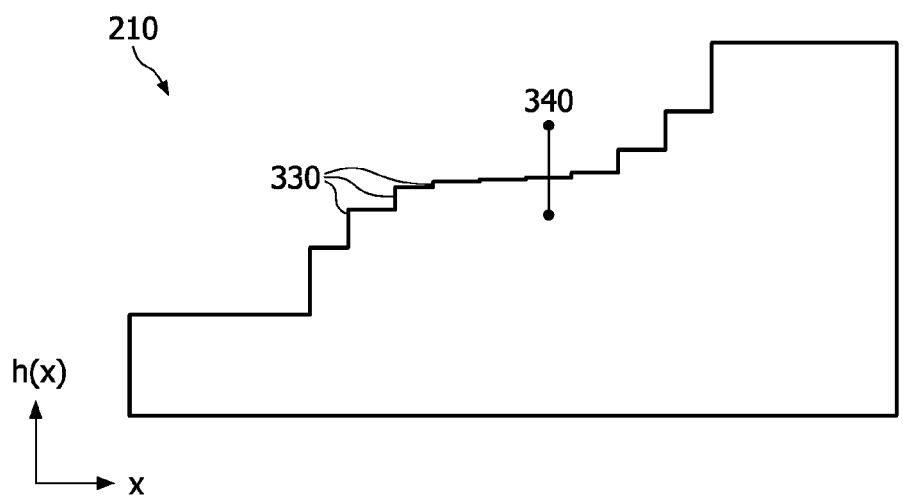
FIG. 3 is a schematic cross-sectional drawing of a high-order dispersion compensation device according to the present invention.

FIG. 3 is a schematic cross-sectional drawing of a high-order dispersion compensation device 210 according to the present invention, the device being adapted to cooperate with a pair of optical components P1 and P2 (not shown in FIG. 3) arranged to compensate first-order dispersion by separating different wavelengths spatially, the compensation device having the form of a phase plate, wherein the phase change for each wavelength is adjusted by designing the height h at the corresponding position x of the plate so as to substantially compensate for higher-order dispersion. The height as a function of position h(x) i.e. the height distribution is normally a monotonically increasing function, at least on some parts of the plate 210, and preferably the height as a function of position h(x) is approximately a third order polynomial, or higher, at least on some parts of the plate 210. For practical applications, the device may however be implemented by stepped heights 330 to facilitate manufacturing. The height difference between each step 330 should however not be too coarse. Typical dimensions could be a horizontal width, x, of 10 mm, whereas the vertical height difference is in the order of 40 wavelengths, i.e. 30 micrometers for 750 nm wavelength.

For a prism pair, as shown in FIG. 1, quadratic chirp effects can limit the dispersion compensation. The instantaneous frequency equals the first derivative of the optical phase with respect to time, the linear chirp corresponds to the second derivative of the optical phase with respect to time, and the quadratic chirp is the same as a cubic term in the phase. For a prism pair this amounts to:

$$\frac{\partial^3 \phi}{\partial \omega^3} = \left(\frac{\lambda}{2\pi c}\right)^2 \frac{12l\lambda^2}{c} \left[\left(\frac{\partial n}{\partial \lambda}\right)^2 + \lambda \frac{\partial n}{\partial \lambda}\frac{\partial^2 n}{\partial \lambda^2}\right]$$

In one example, a dispersion compensator where the prisms are made of SF66 glass and their distance is 350 mm. The maximum amount of linear dispersion that can be compensated is 13000 fs$^2$ (fs=femtoseconds=$10^{-15}$ s), substantially enough for most microscope systems. The higher order dispersion however amounts to approximately 41000 fs$^3$. The effect of all this amounts to the following: With a laser source with central wavelength λ of 800 nm and a band width of 40 nm one should be able to make pulses as short as 24 fs. Without first-order prism compensator the pulse width at the focus of the objective of our multi-photon system is more than 2 ps. With first-order prism compensator one obtains a pulse width of about 45 fs.

In order to provide for high-order dispersion compensation, the phase φ for each wavelength λ is then adjusted by setting the height h of the plate or device 210 at the corresponding position x according to the present invention. The central wavelength traverses through the phase plate at position x=0 as indicated by the bar 340. The device is designed for high-order dispersion compensating when a centre wavelength of an incoming radiation beam enters the device at this substantially central position of the device. The device could however also be designed with an asymmetrical height distribution depending on the radiation and/or the optical setup to be dispersion compensated.

A small change in wavelength will give rise to a small deflection over a distance:

$$\frac{\partial x}{\partial \lambda} = \frac{2l}{\cos(\theta)} \frac{\partial n}{\partial \lambda}$$

here l is the distance between the prisms, which are assumed to be Brewster angle prisms. The angle is the angle of incidence to the phase plate (which is optimum for Brewster angle) and n is the refractive index of the prisms. The relation between the height of the plate and the induced phase change is, at Brewster angle, equal to:

$$\Delta\phi(x) = \frac{2\pi h(x)}{\lambda} \frac{n^2 - 1}{\sqrt{n^2 + 1}},$$

where the refractive index n is now understood to be related to the material of the compensation device 210. Using the above two equations, one can create a functional form that compensates the higher dispersion of the prism pairs, or other optically equivalent first-order dispersion compensation devices.

Figure 4:
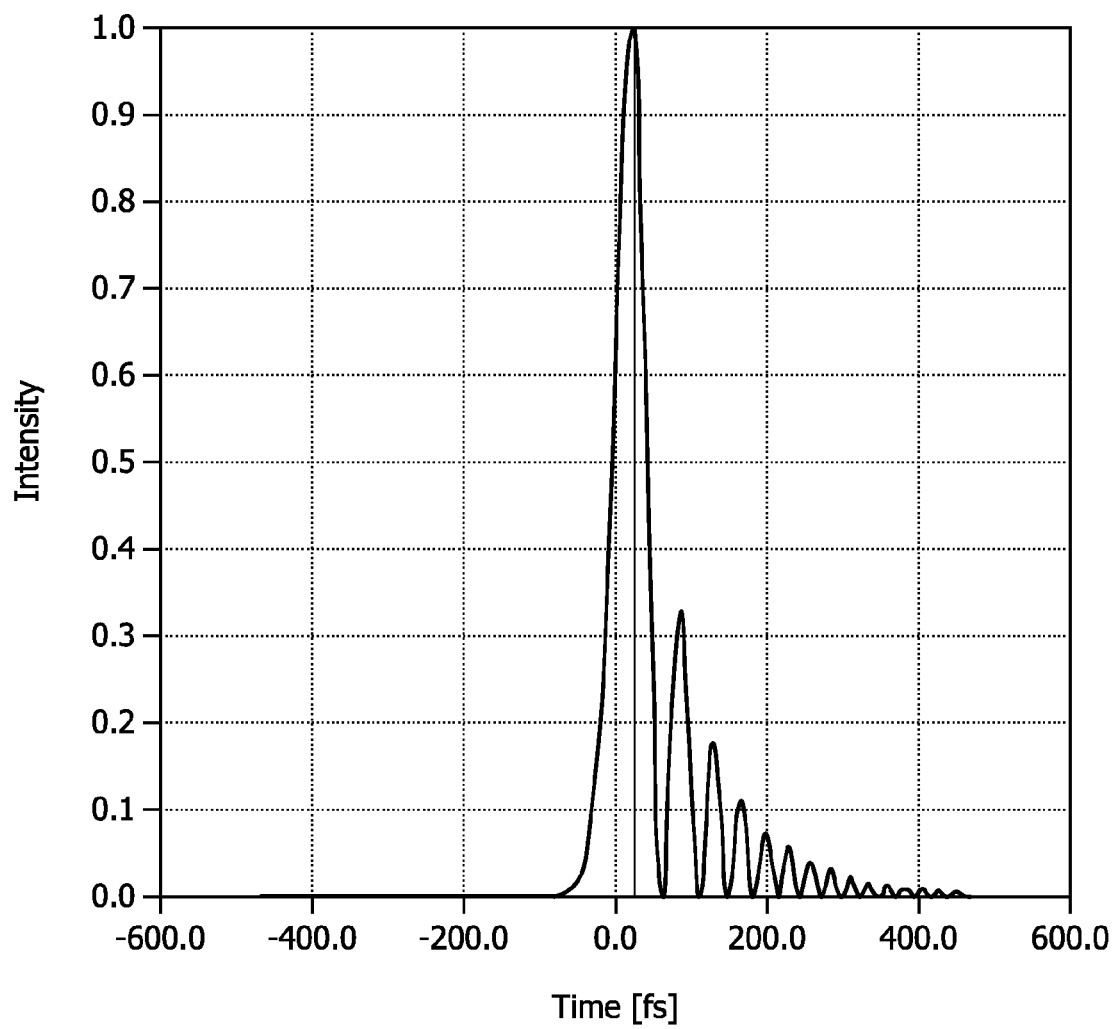
FIGS. 4 and 5 show the optical pulse forms without and with, respectively, the addition of the high-order dispersion compensation device according the present invention, FIG. 6 displays the height distribution for the compensation device used in connection with FIG. 5.
Figure 5:
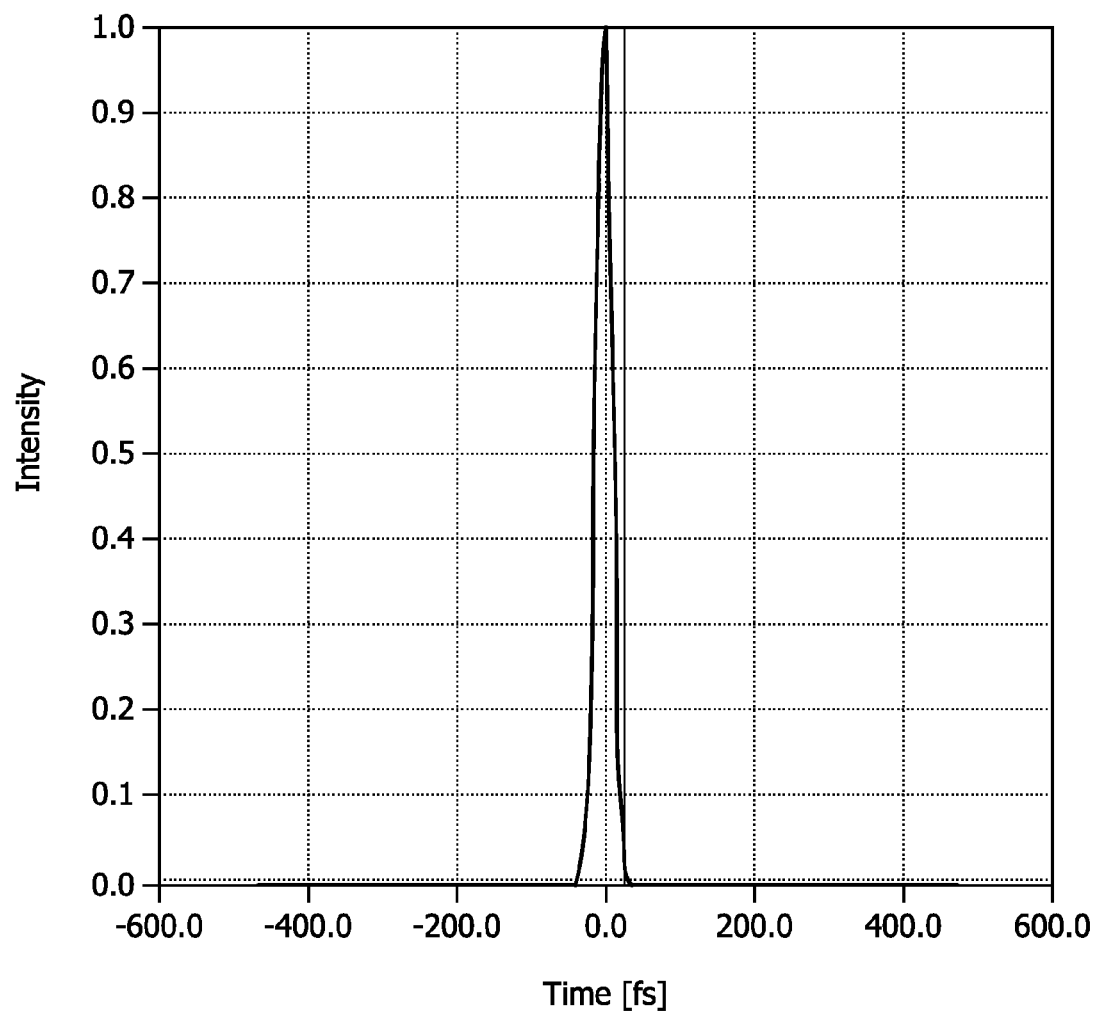

FIGS. 4 and 5 show optical pulse forms without and with, respectively, the addition of the high-order dispersion compensation device 210 according the present invention, FIG. 4 is an optical pulse with a cubic phase of 41000 fs$^3$. FWHM is 47.6 fs. The bandwidth is 40 nm at a central wavelength of 800 nm, so that the Fourier limited pulse width is 23.6 fs. The optical pulse is compensated for linear chirp with a pulse compressor comprising two SF66 glass prisms at a distance of 350 mm in dual pass similar to FIG. 1. The band width of the source in this case is 40 nm at a centre wavelength of 800 nm. The effective pulse width is approximately 48 fs, the higher order dispersion is seen to give rise to a substantial amount of ringing in the tail of the pulse. FIG. 5 shows the optical pulse after passing twice through a higher-order dispersion compensation device 210 comprising 61 steps and compensating the phase over 200 nm bandwidth. The FWHM of the resulting pulse is 25.2 fs. Thus, after the optical pulse has traversed an optimized stepped phase plate 210 the ringing at the tail of the pulse is gone, and the pulse width has decreased from 47 fs down to 25 fs.

Figure 6:
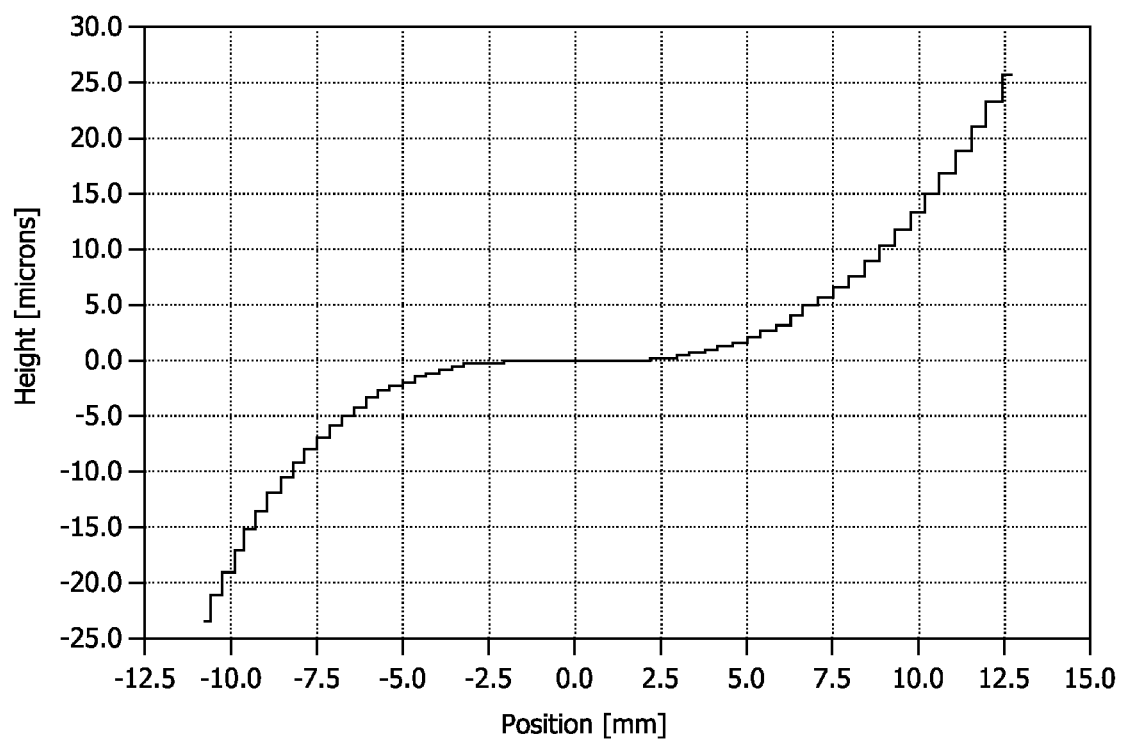

FIG. 6 displays the height distribution for the compensation device used in connection with FIG. 5. The phase plate is made of PMMA (refractive index 1.486) and used under Brewster angle. The horizontal extent of about 23 mm corresponds to 200 nm band width in a prism compensator made of SF66 glass and prism distance of 350 nm. The height distribution is performed with 61 phase steps. The phase plate can be optimised in various ways. One may take equidistant step widths in frequency space as is used in the above examples. On the other hand, the number of required steps can be minimized. Hence the step width distribution can be optimised to have optimal effect for a fixed number of steps. This in general results in a distribution having wider steps near the central frequency and a more fine distribution for frequencies further away from the central frequency.

Figure 7:
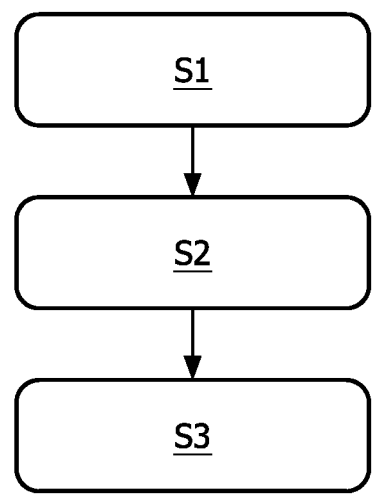
FIG. 7 is a flow-chart of a method according to the invention.

FIG. 7 is a flow-chart of a method according to the invention, the method comprising S1 providing a pair of optical components P1 and P2 arranged to compensate first-order dispersion by separating different wavelengths spatially, and S2 providing a higher-order dispersion compensation device 210, the compensation device having the form of a phase plate, wherein the phase change for each wavelength is adjusted by designing the height at the corresponding position of the plate so as to substantially compensate for higher-order dispersion, S3 the method further comprising adapting the higher-order dispersion compensation device to cooperate with the pair of optical components by taking into account, at least;

the optical properties O_Prop of the pair of optical components, and the relative positions RP between the higher-order dispersion compensation device and the pair of optical components.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A higher-order dispersion compensation device (210), the device being adapted to cooperate with a pair of optical components (P1, P2) arranged to compensate first-order dispersion by separating different wavelengths spatially, the compensation device having the form of a phase plate, wherein the phase change for each wavelength is adjusted by designing a height at the corresponding position of the plate so as to substantially compensate for higher-order dispersion, and wherein the higher-order dispersion compensation device is adapted to cooperate with the pair of optical components by taking into account at least optical properties (O_Prop) of the pair of optical components, and relative positions (RP) between the higher-order dispersion compensation device and the pair of optical components.

2. The device according to claim 1, wherein the height as a function of position (h(x)) is a substantially continuous function, at least on some parts of the plate (210).

3. The device according to claim 1, wherein the device (210) has a substantially plane rear surface, and a front surface with stepped heights, at least on some parts of the plate.

4. The device according to claim 1, wherein the height as a function of position (h(x)) is a monotonically increasing function, at least on some parts of the plate (210).

5. The device according to claim 1, wherein the device is adapted to cooperate with a pair of substantially identical components.

6. The device according to claim 1, wherein the relation between the phase change, $\Delta\phi$, as a function of position, x, across the device and the height as a function of position across the device, h(x), has a form of $$\Delta\phi(x)=h(x)F(\lambda,O\_Pa,RP,O\_Prop),$$

where the function F is dependent on:
λ: the wavelength
O_Pa: the optical path
RP: the relative positions of the plate and pair of optical components, and
P_Prop: the optical properties of the pair of optical components.

7. The device according to claim 1, wherein the pair of optical components is pair of prisms, and the optical properties of the pair of optical components, O_Prop, comprises the refractive index, n, of the prisms, and the top angle of the prisms.

8. The device according to claim 1, wherein the pair of optical components is pair of gratings, and the optical properties of the pair of optical components, O_Prop, comprises the grating constant, k, of the gratings.

9. The device according to claim 1, wherein the device is manufactured substantially in a polymer or in a type of glass.

10. The device according to claim 1, wherein the device is manufactured with UV-curable resin on a transparent substrate.

11. The device according to claim 1, wherein the height distribution is depending on the relative positions between the higher-order dispersion compensation device and the pair of optical components comprises the distance (l) and angle of incidence (θ) to each optical component.

12. The device according to claim 1, wherein the pair of optical components is a substantially identical pair of prisms, and the optical properties (O_Prop) of the pair of prisms comprise the refractive index, n, and the wavelength dependent part of the refractive index in the prisms.

13. An optical system (200) for compensating dispersion; the system comprising:

a pair of optical components (P1, P2) arranged to compensate first-order dispersion by separating different wavelengths spatially, and a higher-order dispersion compensation device (210), the compensation device having the form of a phase plate, wherein the phase change for each wavelength is adjusted by designing a height at the corresponding position of the plate so as to substantially compensate for higher-order dispersion, wherein the higher-order dispersion compensation device is adapted to cooperate with the pair of optical components by taking into account at least the optical properties (O_Prop) of the pair of optical components, and the relative positions (RP) between the higher-order dispersion compensation device and the pair of optical components.

14. The optical system according to claim 13, wherein the height distribution is depending on the relative positions between the higher-order dispersion compensation device and the pair of optical components comprises the distance (l) and angle of incidence (θ) to each optical component.

15. The optical system according to claim 13, wherein the pair of optical components is a substantially identical pair of prisms, and the optical properties (O_Prop) of the pair of prisms comprise the refractive index, n, and the wavelength dependent part of the refractive index in the prisms.

16. The optical system according to claim 13, the system being applied in an optical imaging system utilizing non-linear optical phenomena.

17. The optical system according to claim 13, wherein the relation between the phase change, $\Delta\phi$, as a function of position, x, across the device and the height as a function of position across the device, h(x), has a form of $$\Delta\phi(x)=h(x)F(\lambda,O\_Pa,RP,O\_Prop),$$

where the function F is dependent on:
- λ: the wavelength
- O_Pa: the optical path
- RP: the relative positions of the plate and pair of optical components, and
- O_Prop: the optical properties of the pair of optical components.

18. The optical system according to claim 13, wherein the pair of optical components is pair of prisms, and the optical properties of the pair of optical components, O_Prop, comprises the refractive index, n, of the prisms, and the top angle of the prisms.

19. The optical system according to claim 13, wherein the pair of optical components is pair of gratings, and the optical properties of the pair of optical components, O_Prop, comprises the grating constant, k, of the gratings.

20. A method for compensating dispersion, the method comprising:

providing a pair of optical components (P1, P2) arranged to compensate first-order dispersion by separating different wavelengths spatially, providing a higher-order dispersion compensation device (210), the compensation device having the form of a phase plate, wherein the phase change for each wavelength is adjusted by designing the height at the corresponding position of the plate so as to substantially compensate for higher-order dispersion, and adapting the higher-order dispersion compensation device to cooperate with the pair of optical components by taking into account, at least; the optical properties (O_Prop) of the pair of optical components, and the relative positions (RP) between the higher-order dispersion compensation device and the pair of optical components.

* * * * *